Sept. 17, 1957 J. M. MORRIS 2,806,583
DISCHARGE GATE FOR CONVEYORS
Filed July 14, 1953
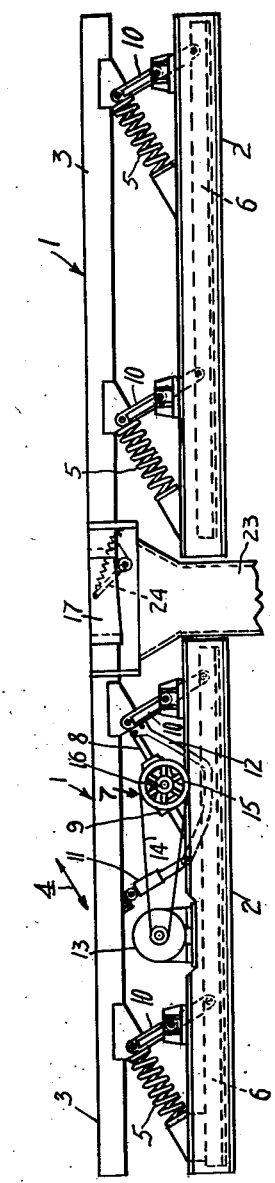
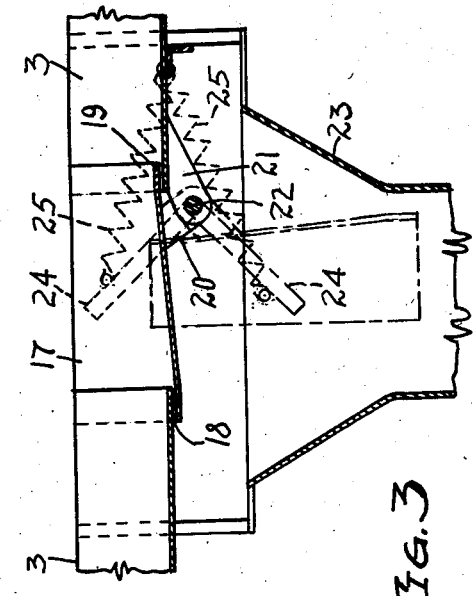
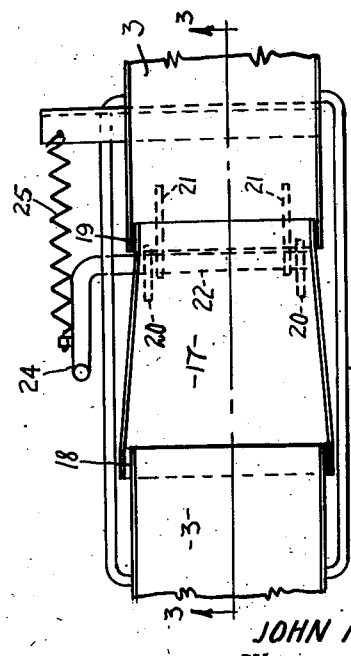
INVENTOR.
JOHN M. MORRIS
BY
Oberlin & Limbach
ATTORNEYS

United States Patent Office 2,806,583
Patented Sept. 17, 1957

2,806,583

DISCHARGE GATE FOR CONVEYORS

John M. Morris, Louisville, Ky., assignor to Carrier Conveyor Corporation, Louisville, Ky., a corporation of Kentucky Application July 14, 1953, Serial No. 367,935

1 Claim. (Cl. 198—220)

The present invention relates generally as indicated to a discharge gate for conveyors, and particularly to a discharge gate for vibrating conveyors of the type wherein the path of vibration is oblique to the material supporting surface of the conveyors so that the material which is being conveyed is tossed upwardly and forwardly relative to the supporting surface of the conveyors and thus advanced therealong.

In the conveying of various powdered or granular materials, it has been common practice to provide an intermediate discharge gate at a selected point along a conveyor, said gate usually being hinged for movement between closed and open positions whereat said gate constitutes a connecting link joining together the adjacent conveyor sections and whereat said gate permits discharge of the conveyed material from the end of one adjacent conveyor section into a suitable hopper or the like. Such known type of discharge gate has been open to the objection that in its closed position considerable leakage of the conveyed material occurs through the joints between the gate and the adjacent conveyor sections unless the gate and the adjacent conveyor sections are manufactured to extremely close tolerances or unless gaskets or the like are employed, in which event, manufacturing costs are high; and, furthermore, in the case of close fitting parts, maintenance costs are high since any wearing or relative distortion of the parts and of the gate mounting results in leakage gaps between the gate and adjacent conveyor sections. Moreover, when a rigid hinge or bearing for the gate is employed, intense vibration results in prompt fatigue failure; and, of course, the use of an elastic bearing, while solving the problem of early fatigue failure, permits relative movement between the gate and the adjacent conveyor sections and thus aggravates the tendency of leakage through the joints.

It is, therefore, an object of the present invention to provide a discharge gate construction which avoids the foregoing objections to existing forms of discharge gates.

It is another object of this invention to provide a discharge gate construction wherein the joints between the closed discharge gate and the adjacent conveyor sections are disposed so that the direction of travel of the conveyed material is away from the joints whereby no leakage occurs even though said gate and conveyor sections are not closely fitted together, and wherein the bearings, hinges, or like mountings of the discharge gate are fully protected from malfunctioning and damage by reason of the elimination of leakage of the conveyed material.

Other objects and advantages will become apparent as the following description proceeds.

To the accomplishment of the foregoing and related ends, the invention, then, comprises the features hereinafter fully described and particularly pointed out in the claim, the following description and the annexed drawing setting forth in detail one illustrative embodiment of the invention, this being indicative, however, of but one of the various ways in which the principle of the invention may be employed.

In said annexed drawing:

Fig. 1 is a side elevation view of endwise adjacent vibrating conveyor sections with the discharge gate constituting the present invention disposed therebetween;

Fig. 2 is an enlarged top plan view of the discharge gate in its closed position between the adjacent conveyors; and Fig. 3 is an enlarged cross-section view of the discharge gate taken along line 3—3, Fig. 2, showing in dot-dash lines the open position of the gate for discharging the conveyed material from one adjacent conveyor into a hopper or the like.

Referring now more particularly to the drawing, and first to Fig. 1 thereof, each of the adjacent conveyor sections 1 is shown as comprising a frame or base construction 2 and a resiliently supported conveyor trough 3 adapted for vibration along an oblique path as denoted by the line 4 to thereby convey material from left to right as viewed in Fig. 1 by tossing the material forwardly and upwardly, said troughs 3 being rigidly joined together for vibration in unison by a single drive means.

Each trough 3 is resiliently mounted on springs 5 compressed between said trough and a counterbalance assembly 6, and vibration of said trough and said counterbalance assembly 6 in direct phase opposition is effected as by means of an eccentric drive unit 7 which, operating through the linkage mechanism which includes a connecting rod 8 and a journal block 9 connected to one trough 3 and assembly 6 respectively; and links 10 pivotally connected to said troughs and assemblies at their ends and to said frames 2 intermediate their ends, cause opposite and equal vibrations of said counterbalance assemblies 6 and said troughs 3. These conveyor sections 1 are designed for operation at the natural frequencies of said springs 5 and at a predetermined uniform amplitude, and for such purpose an extensible link in the form of a hydraulic shock absorber unit 11 and a link 12 is employed to provide a substantially positive drive of predetermined stroke at the natural frequency of say 500 cycles per minute, for example, and to allow a gradual settling of the troughs 3 under varying loads of conveyed material thereon.

Said link 12 is pivotally connected at one end to one trough 3 and at the other end to one end of said unit 11, the connecting rod 8 being pivotally connected to said link 12. Thus, as the load on the conveyor varies, the link 12 will cause lengthening or shortening of the unit 11 without transmitting added load on rod 8 or drive unit 7, and at any settled position of the conveyor, the amplitude of vibration will remain constant, since at 500 cycles per minute, for example, the unit 11 is, for all practical purposes, of fixed length.

It is to be understood that, for the purposes of the present invention, the vibration of the troughs 3 may be induced by means other than herein disclosed, and that the particular mechanism herein is to be regarded merely as typical.

In Fig. 1, the numeral 13 denotes an electric drive motor which through belt 14 and pulley 15 is operative to rotate the shaft 16 of the eccentric drive unit 7.

Located between said troughs 3 and hinged to one of them is the discharge gate 17 which constitutes the present invention, said discharge gate being in the form of a trough which externally and rearwardly overlaps or embraces the end of the trough 3 from which the material being conveyed comes, and which internally and forwardly overlaps or fits within the end of the other trough 3 toward which the material is being conveyed. Thus, the joints 18 and 19 between said discharge gate 17 and the adjacent troughs 3 are disposed so that the conveyed material is at all times being conveyed in a direction away from said joints, and therefore said gate need not be closely fitted around and within said troughs 3; and, in fact, there may be considerable clearance as clearly shown in Figs. 2 and 3.

Said discharge gate 17 is provided with ears 20 or the like, and similarly the adjacent forward trough 3 is provided with ears 21, and a shaft 22 extending through said ears 20 and 21 serves to hingedly connect said gate 17 to said trough 3 so that said gate may be swung downwardly to the dot-dash line open position as shown in Fig. 3 whereby the material conveyed by the left or rear trough 3 may be discharged into a suitable discharge hopper or spout 23, the swinging movement of said gate 17 about shaft 22 being such that the rear end of said discharge gate which externally and rearwardly overlaps or embraces the left-hand trough 3 swings downwardly away from said trough, and the front end of said gate which internally and forwardly overlaps within the right-hand trough 3 swings upwardly and away from the latter. Thus, the material which is being conveyed simply flows over the edge of the left-hand trough 3 into the discharge hopper or spout 23; and, of course, when said discharge gate 17 is swung back to the solid line position, the vibration of said gate along with the troughs 3 will cause the material which is deposited thereonto to be conveyed toward the right and away from the joints 18 and 19. Said spout 23 is preferably in the form of a box or yoke as shown so as to rigidly connect together the adjacent ends of troughs 3 in spaced apart relation to accommodate gate 17 therebetween.

Said shaft 22 is bent to provide a handle 24, and a further feature of this invention resides in the provision of a tension spring 25 connected to said handle 24 and to trough 3 which serves to constantly hold the hinge shaft 22 which is welded to ears 20 against one side of the bearing surfaces in the ears 21 without clearance in both the open and closed positions of the gate 17. Such spring loading on the hinge precludes intense vibration from causing early fatigue failure, and further eliminates the necessity of close fits between the shaft 22 and the bearings therefor. If desired, rubber bushings may be employed in the ears 21. Because spring 25 acts through a lever arm about the shaft pivot in both the open and closed positions of the gate 17, the gate is thereby held in either position without necessity of providing latches or the like.

Other modes of applying the principle of the invention may be employed, change being made as regards the details described, provided the features stated in the following claim, or the equivalent of such, be employed.

I therefore particularly point out and distinctly claim as my invention:

In combination, endwise spaced-apart conveyor trough sections adapted to be vibrated for movement of material therein forwardly thereof, and a trough-shaped gate section pivotally supported about an axis transverse to said trough sections for pivotal movement from a first position wherein said gate section spans the gap between the ends of said sections and constitutes an intermediate trough section to convey material from one trough section to the other to a second generally vertical position wherein a discharge gap is defined between said gate section and the end of said one trough section, said gate section, when in such first position, having its bottom and sides externally overlapping the bottom and sides of the end portion of said one trough section and internally overlapping the bottom and sides of the end portion of said other trough section whereby material on said trough sections and gate section is conveyed away from such overlapping trough section-gate section joints.

References Cited in the file of this patent

UNITED STATES PATENTS

| | | |
|---|---|---|
| 493,772 | Hassell | Mar. 21, 1893 |
| 857,164 | Edtbauer | June 18, 1907 |
| 2,386,717 | Sample | Oct. 9, 1945 |
| 2,588,030 | Musschoot et al. | Mar. 4, 1952 |